(12) United States Patent
Petrie et al.

(10) Patent No.: US 6,228,338 B1
(45) Date of Patent: May 8, 2001

(54) PREPARATION OF ALUMINUM HYDRIDE POLYMORPHS, PARTICULARLY STABILIZED α-ALH₃

(75) Inventors: Mark A. Petrie, Cupertino; Jeffrey C. Bottaro, Mountain View; Robert J. Schmitt, Palo Alto; Paul E. Penwell, Palo Alto; David C. Bomberger, Belmont, all of CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 09/334,359

(22) Filed: Jun. 16, 1999

(51) Int. Cl.⁷ ....................................... C01B 6/00
(52) U.S. Cl. .......................... 423/265; 423/274; 423/645
(58) Field of Search .................................. 423/645, 265, 423/274

(56) References Cited

U.S. PATENT DOCUMENTS

| | | |
|---|---|---|
| 3,801,657 | 4/1974 | Scruggs . |
| 3,801,707 * | 4/1974 | Ardis et al. ........................... 423/645 |
| 3,810,974 | 5/1974 | King . |
| 3,812,244 | 5/1974 | Schmidt et al. . |
| 3,816,192 | 6/1974 | Brower et al. . |
| 3,819,335 * | 6/1974 | Daniels et al. ....................... 423/645 |
| 3,819,819 * | 6/1974 | Matzek et al. ....................... 423/645 |
| 3,821,044 | 6/1974 | Roberts . |
| 3,823,226 * | 7/1974 | Brower et al. ....................... 423/645 |
| 3,826,820 * | 7/1974 | Roberts et al. ...................... 423/645 |
| 3,838,194 * | 9/1974 | Reigler et al. ...................... 423/645 |
| 3,838,195 * | 9/1974 | Reigler et al. ...................... 423/645 |
| 3,840,654 * | 10/1974 | Schmidt et al. ..................... 423/645 |
| 3,843,774 * | 10/1974 | York et al. ........................... 423/645 |
| 3,850,709 | 11/1974 | Schmidt . |
| 3,857,930 | 12/1974 | Kraus et al. . |
| 3,869,544 * | 3/1975 | Niles et al. ........................... 423/645 |
| 3,869,545 | 3/1975 | Terada et al. . |
| 3,883,644 * | 5/1975 | Matzek et al. ....................... 423/645 |
| 4,006,095 | 2/1977 | Hoffman et al. . |
| 4,048,087 | 9/1977 | Daniels et al. . |
| 5,670,129 | 9/1997 | Klapdor et al. . |
| 5,730,952 | 3/1998 | Rathman et al. . |

FOREIGN PATENT DOCUMENTS

833646 * 1/1957 (GB) .................................... 423/645

OTHER PUBLICATIONS

Brower et al. (1976), "Preparation and Properties of Aluminum Hydride," *Journal of the American Chemical Society*, 98(9):2450–2453 (no month).

Bulychev et al. (1998), "Complex Compounds of Aluminum Hydride Ethoxide with Mixed Aluminum and Boron Hydrides of Lithium and Magnesium: Compositions, Physicochemical Properties, and Synthesis of Unsolvated Aluminum Hydride," *Russian Journal of Inorganic Chemistry*, 43(5):752–758 (no month).

Tskhai et al. (1992), "The Kinetics and a Mathematical Model of the Isothermal Crystallisation of Aluminum Hydride from Ether–Toluene Solutions," *Russian Journal of Inorganic Chemistry*, 37(8):877–885. (no month).

Zakharov et al. (1992), "The Thermal Transformations of Ether Addition Compounds of Aluminum Hydride," *Russian Journal of Inorganic Chemistry*, 37(9):997–1005, (no month).

* cited by examiner

Primary Examiner—Wayne Langel
(74) *Attorney, Agent, or Firm*—Dianne E. Reed; Reed & Associates

(57) ABSTRACT

The present invention features methods for preparing stabilized α-AlH₃ and α'-AlH₃, compositions containing these alane polymorphs, e.g., energetic compositions such as rocket propellants, and methods for using the novel polymorphs as chemical reducing agents, polymerization catalysts, and as a hydrogen source in fuel cells and batteries. The method produces stabilized alane by treating α-AlH₃ with an acidic solution that optionally contains a stabilizing agent such as an electron donor, an electron acceptor, or a compound which coordinates the Al³⁺ ion.

15 Claims, 1 Drawing Sheet

PREPARATION OF ALUMINUM HYDRIDE POLYMORPHS, PARTICULARLY STABILIZED α-ALH₃

REFERENCE TO GOVERNMENT SUPPORT

This invention was funded in part by the United States Office of Naval Research under Contract No. N68936-98-C-0009. The United States Government has certain rights in this invention.

TECHNICAL FIELD

The present invention relates generally to aluminum hydride, or "alane," and more particularly relates to a novel method for preparing aluminum hydride polymorphs such as α-AlH₃ and α'-AlH₃. The invention additionally relates to a stabilized form of α-AlH₃, to energetic compositions, particularly propellant compositions, containing, as a fuel, stabilized α-AlH₃ and/or α'-AlH₃ prepared using the method of the invention, and to methods of using the alane polymorphs prepared herein as chemical reducing agents, as polymerization catalysts, and as a source of hydrogen gas such as in batteries and fuel cells.

BACKGROUND

Aluminum hydride, also referred to as "alane," is usually prepared as a solution by the reaction of lithium aluminum hydride with aluminum trichloride. A. E. Finholt et al. (1947) *J. Chem. Soc.* 69:1199. The alane-containing solution, however, is not stable, as an alane-ether complex precipitates from solution shortly after preparation. In addition, attempts to isolate the nonsolvated form of alane from the ether solution result in the decomposition of the complex to aluminum and hydrogen. M. J. Rice Jr. et al. (1956) Contract ONR-494(04) ASTIA No. 106967, U.S. Office of Naval Research.

In a method for preparing non-solvated alane, alane-etherate may be desolvated in the presence of a small amount of lithium aluminum hydride. See, for example, A. N. Tskhai et al. (1992) *Rus. J. Inorg. Chem.* 37:877, and U.S. Pat. No. 3,801,657 to Scruggs. Non-solvated alane exhibits six crystalline phases, with each having different physical properties. The phase designated as α'-alane is essentially non-solvated and appears under a polarizing microscope as small multiple needles growing from single points to form fuzzy balls. The γ phase appears as bundles of fused needles. The γ phase is produced in conjunction with the β phase, and both γ- and β-alane are metastable nonsolvated phases that convert to the more stable α-alane upon heating. The α-alane is the most stable, and is characterized by hexagonal or cubic shaped crystals that are typically 50–100 μm in size. The other two forms, designated δ- and ε-alane, are apparently formed when a trace of water is present during crystallization, and the ζ-alane is prepared by crystallizing from di-n-propyl ether. The α', δ, ε and ζ polymorphs do not convert to the α-alane and are less thermally stable than the α-form. For a discussion of the various polymorphs, reference may be had to F. M. Brower at al. (1976) *J Am. Chem. Soc.* 98:2450.

Alane consists of about 10% hydrogen by weight, thereby providing a higher density of hydrogen than liquid hydrogen. Because of the high hydrogen density and the highly exothermic combustion of aluminum and hydrogen, alane can be used as a fuel for solid propellants or as an explosive.

Solvated alane can be synthesized by the reaction of LiAlH₄ with aluminum chloride, resulting in the alane.etherate complex (equation 1).

Equation 1
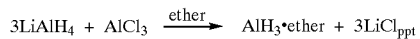

In an alternative synthesis, LiAlH₄ is reacted with sulfuric acid to give the alane.etherate complex (equation 2).

Equation 2

The AlH₃-ether complex is then treated with a mixture of LiAlH₄ and LiBH₄, and heated (equation 3).

Equation 3

The combination of LiBH₄/LiAlH₄ enables use of a lower processing temperature, and α-alane is the final product after heating at 65° C. under vacuum. In an alternative synthesis, Bulychev reports that α-alane can be prepared at pressures greater than 2.6 GPa and at temperatures in the range of 220–250° C. B. M. Bulychev et al. (1998) *Russ. J. Inorg. Chem.* 43:829. Under those conditions, apparently only the α-alane form is observed.

In addition, alane can be directly synthesized by metathesis of aluminum alkyls followed by removal of the alkylaluminum byproduct in vacuum (equation 4).

Equation 4
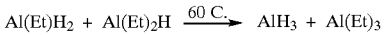

Still another method of preparing nonsolvated alane is by bombarding an ultrapure aluminum target with hydrogen ions. However, alane thus produced has poor crystallinity.

One of the obstacles to large scale production of α-alane is the handling of the diethyl ether solution of the alane•ether complex. At concentrations of about 0.5 M or higher and temperatures above 0° C. the alane•ether phase prematurely precipitates out of solution. In addition, α-alane can be contaminated with other phases of alane, and is not stable over time as the complex decomposes to hydrogen and aluminum.

Thus, although alane is potentially promising as a high energy density fuel, because of its high hydrogen density and the highly exothermic combustion of aluminum and hydrogen, the lack of a suitable method for synthesizing alane in a stabilized form has severely limited its applicability.

SUMMARY OF THE INVENTION

Accordingly, it is a primary object of the invention to address the above-mentioned need in the art and provide a method for synthesizing α-alane in a stabilized form.

It is another object of the invention to provide stabilized α-alane as a novel composition of matter, prepared using the aforementioned method.

It is an additional object of the invention to provide a method for synthesizing α'-alane.

It is a further object of the invention to provide energetic compositions containing stabilized α-alane or α'-alane, prepared using the methods described herein.

It is still a further object of the invention to provide such energetic compositions in the form of a propellant composition.

It is also an object of the invention to provide methods for using stabilized α-alane or α'-alane, prepared using the methods described herein, as an energy dense fuel, as a chemical reducing agent, as a polymerization catalyst, and as a source of hydrogen gas such as in batteries and fuel cells.

Additional objects, advantages and novel features of the invention will be set forth in part in the description which follows, and in part will become apparent to those skilled in the art upon examination of the following, or may be learned by practice of the invention.

In one embodiment, then, the invention relates to a method for preparing stabilized α-$AlH_3$ wherein: (a) an alkali metal hydride is initially reacted with $AlCl_3$ in diethyl ether to form an initial $AlH_3$ product and an alkali metal chloride; (b) the reaction mixture is filtered to remove the alkali metal chloride; (c) an excess of toluene is added to the filtrate of step (b), resulting in a diethyl ether-toluene solution; (d) the diethyl ether-toluene solution is heated and distilled to reduce the amount of diethyl ether in solution, until a precipitate is formed; (e) the precipitate is isolated; and (f) the isolated precipitate is added to an acidic solution effective to dissolve and thus remove materials other than α-$AlH_3$. In a preferred embodiment, the acidic solution contains an α-$AlH_3$ stabilizing agent, e.g., a compound that coordinates to the $Al^{3+}$ ion, an electron donor, or an electron acceptor.

In another embodiment, the invention provides a method for synthesizing α'-$AlH_3$ wherein (a) an alkali metal hydride is initially reacted with $AlCl_3$ in diethyl ether to form an initial $AlH_3$ product and an alkali metal chloride; (b) the reaction mixture is filtered to remove the alkali metal chloride; (c) an additional alkali metal hydride and an excess of toluene are added to the filtrate of step (b), providing a diethyl ether solution containing α'-$AlH_3$ and optionally other $AlH_3$ polymorphs; and (d) removing the α'-$AlH_3$ is from the solution.

In a further embodiment of the invention, a propellant composition is provided containing fuel, a binder material, and an oxidizer, wherein the fuel is a stabilized α-$AlH_3$ product or an α'-$AlH_3$ product prepared using the aforementioned techniques. The alane polymorphs of the invention are compatible with a wide range of binder materials, oxidizers, secondary fuels, and other propellant components, and provide for a propellant that is chemically and physically stable over an extended period of time.

The invention also provides methods for using the stabilized α-$AlH_3$ product and the α'-$AlH_3$ product in other contexts. For example, an alane polymorph as synthesized herein may be used as a chemical reducing agent, in any context wherein a hydride donor is appropriate to bring about reduction, e.g., in reducing unsaturated carbon-carbon bonds such as present in alkenes and alkynes, in reducing carbonyl-containing moieties such as ketones, aldehydes, carboxylic acids, and acid chlorides, in converting halides to hydrido moieties, and the like. The present alane polymorphs may also be used as polymerization catalysts, typically in catalyzing addition polymerization reactions, e.g., the polymerization of olefins, and as a hydrogen source in fuel cells and batteries.

DETAILED DESCRIPTION OF THE INVENTION

DEFINITIONS AND NOMENCLATURE

Figure 1:
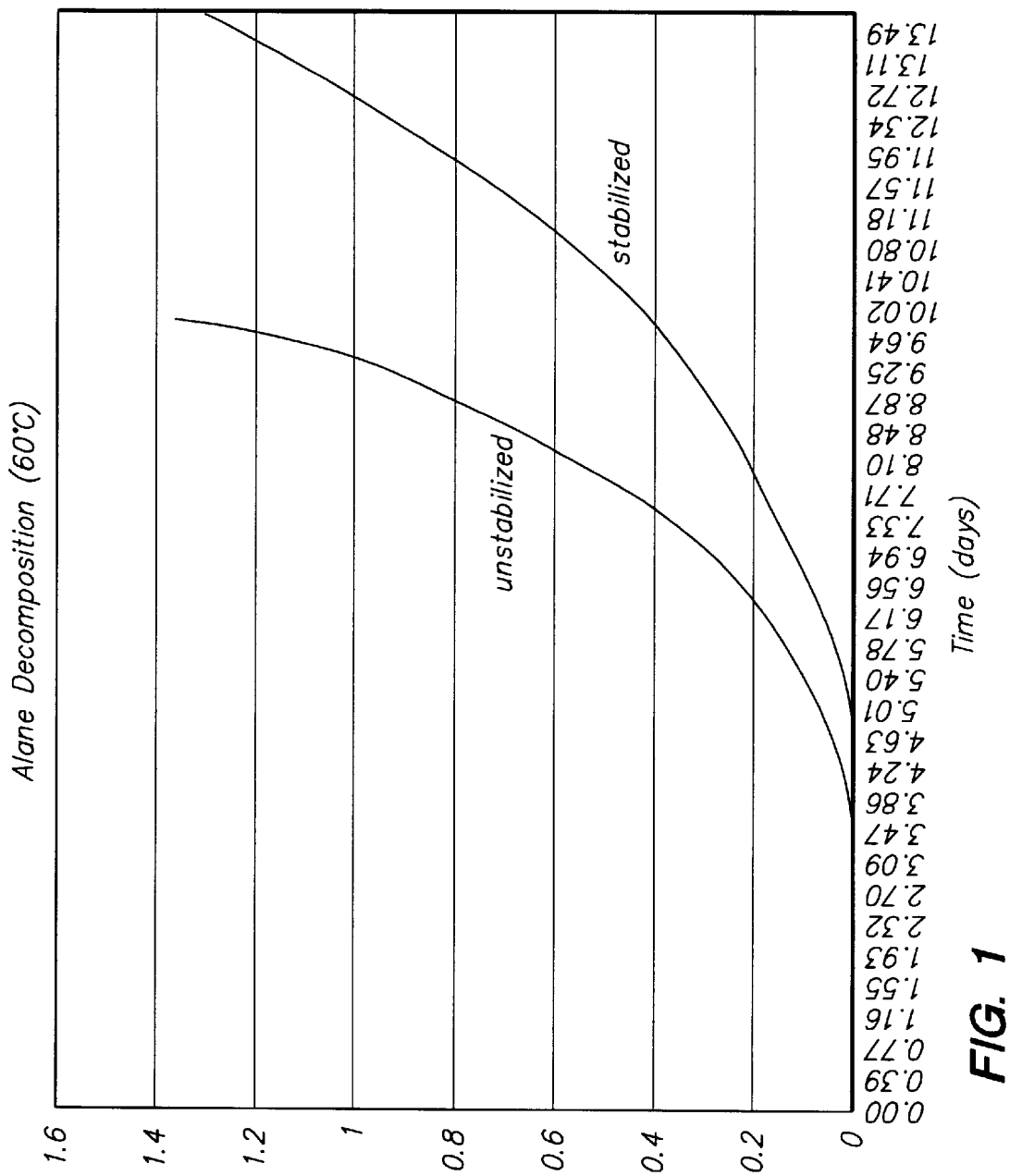
FIG. 1 is a graph illustrating the relative stability of α-alane prepared using a prior art method and α-alane prepared using the method of the invention.

Before the present methods, compounds and compositions are disclosed and described, it is to be understood that unless otherwise indicated this invention is not limited to the use of specific reagents, reaction conditions, composition components, or the like, as such may vary. It is also to be understood that the terminology used herein is for the purpose of describing particular embodiments only and is not intended to be limiting.

It must be noted that, as used in the specification and the appended claims, the singular forms "a," "an" and "the" include plural referents unless the context clearly dictates otherwise. Thus, for example, reference to "a stabilizing agent" includes mixtures of stabilizing agents, reference to "alane" can refer to more than one polymorph of $AlH_3$, and the like.

The term "alane" refers to aluminum hydride, having the formula $AlH_3$, and includes all the polymorphs such as α-$AlH_3$, α'-$AlH_3$, δ-$AlH_3$, and the like.

The term "stabilizing agent" refers to compound that tends to inhibit the decomposition of α-alane. The stabilizing agent can be an electron acceptor, an electron donor, or a compound which coordinates to the $Al^{3+}$ ion.

The term "stabilized" when used to refer to the α-alane product of the invention indicates that the product is substantially more stable than α-alane products of the prior art (i.e., α-alane prepared without the use of an acid wash workup and/or without stabilizing agents as disclosed herein). That is, "unstabilized" α-alane rapidly decomposes to hydrogen and aluminum, while the stabilized α-alane of the invention does not. "Stability" refers to both thermal stability and stability at ambient temperature. With respect to thermal stability, as illustrated in FIG. 1, the "stabilized" α-alane of the invention is less than 1% decomposed after twelve days at 60° C. while decomposition of the unstabilized product at that point is virtually complete (as may be inferred from the graph).

METHOD FOR PREPARING STABILIZED α-$AlH_3$

In a first embodiment of the invention, a method is provided for preparing stabilized α-$AlH_3$. An alane•ether complex, $AlH_3$•$Et_2O$, is initially prepared. Aluminum chloride is dissolved in diethyl ether, and an alkali metal hydride is then added. The alkali metal hydride can be, for example, lithium hydride (LiH), sodium hydride (NaH), potassium hydride (KH), calcium hydride ($CaH_2$), magnesium hydride ($MgH_2$), sodium borohydride ($NaBH_4$), lithium borohydride ($LiBH_4$), lithium aluminum hydride ($LiAlH_4$), sodium aluminum hydride ($NaAlH_4$), or combinations thereof In general, $LiAlH_4$, $LiBH_4$, and combinations thereof are the preferred metal hydrides. The relative proportion of the alkali metal hydride to aluminum chloride is not critical; however, to assure substantially complete conversion of $AlCl_3$ to $AlH_3$, an excess of the alkali metal hydride is preferably used, such as a molar ratio of about 3:1 to 4.5:1, preferably 3.2:1 to 4:1 ($LiAlH_4$:$AlH_3$). The reaction is preferably carried out at a temperature of less than about 0° C. and a temperature of about −10° C. has been found to be optimal. The solution, upon substantial completion of reaction, is filtered to remove the alkali metal chloride, a by-product of the reaction. At this point, it is desirable although not essential to introduce an additional alkali metal hydride into the reaction mixture, e.g., $NaAlH_4$ or $NaBH_4$, to further assist in crystallization of the product, thereby enabling removal of impurities, particularly the slightly soluble alkali metal chloride that results along with the $AlH_3$ etherate complex. The additional alkali metal hydride may or may not be the same as the alkali metal hydride used initially. In this case, a further filtration step is conducted. Then, a large excess of an aromatic organic solvent, e.g., benzene, toluene, xylene, anisole, or the like, is added to the filtrate, assisting in the removal of impurities from the reaction mixture; benzene and toluene are preferred solvents. Alternatively, the reaction can be carried out in a solvent mixture of the ether and the aromatic solvent.

Crystals of $\alpha$-$AlH_3$ can then be obtained by first distilling the ether-aromatic solvent solution to reduce the amount of ether to less than about 10% by volume, preferably by heating, under vacuum, and then heating the solution until a precipitate is formed. Optimally, two cycles of heating are applied to the solution, the first at a temperature in the range of about 82–85° C. for about 1–2 hours, and the second at a temperature in the range of about 90–93° C. for about 20–40 minutes. Crystals of $\alpha$-$AlH_3$ prepared by this method typically reach a size of between 50–100 $\mu$m.

The $\alpha$-alane precipitate is stabilized using an acid wash workup. $\alpha$-Alane is slowly added to a well-stirred dilute acid solution. The acid is chosen from hydrochloric acid, hydrogen fluoride acid, hydrogen bromide acid, phosphoric acid, perchloric acid, sulfuric acid, boric acid, and the like, but most preferably is hydrochloric acid. The concentration of the acid is about 1–25% v/v, preferably about 5–15% v/v, most preferably about 10% v/v. The $\alpha$-alane-containing dilute acid solution is filtered and rinsed, e.g., with water, an organic alcohol, and an organic, solvent. The organic alcohol may be, for example, methanol, ethanol, n-propanol, isopropanol, n-butanol, s-butanol, or t-butanol, and the organic solvent is an ether, preferably diethyl ether. The acid wash workup removes residual impurities such as LiCl, $NaBH_4$, $LiBH_4$, $LiAlH_4$, and the like, as well as any remaining reactive alane polymorphs. In addition, the acid wash provides an $Al(OH)_3$ and $Al_2O_3$ coating on the $\alpha$-alane material, thereby stabilizing the product.

In addition, the surface of the $\alpha$-alane precipitate can be coated with a surface stabilizing agent. The stabilizing agent may be, for example, a compound that coordinates the $Al^{3+}$ ion. In theory, the $Al^{3+}$ ions catalyze the surface decomposition of the $\alpha$-alane, leading to degradation of the bulk sample. Thus, compounds that coordinate $Al^{3+}$ ions prevent the decomposition of $\alpha$-alane, thereby leading to a more stable product. Suitable stabilizing agents that coordinate the $Al^{3+}$ ion are typically polyhydric monomers and polymers and include, but are not limited to, aluminon™ (aurintricarboxylic acid triammonium salt), 8-hydroxyquinoline, and catechol. The amount of the surface stabilizer provided on the aluminum hydride is about 0.1 to 10% of the total weight, preferably about 1 to 5% of the total weight. The surface stabilizers can be applied to the surface of alane during the synthesis of alane, during the acid workup process, or after the $\alpha$-alane has been isolated. Thus, for example, a surface stabilizer can be added during the heating cycles, during the acid wash step, or by slow evaporation of a slurry of alane, e.g., a methanol slurry of alane, containing 1 to 5% of the stabilizers.

Additionally $\alpha$-alane can be doped with other stabilizers that are electron donors or electron acceptors. In theory, photochemical or thermal decomposition of alane is caused by the initial formation of positive ion/electron holes that result in hydrogen evolution. Mobile electrons are theorized to catalyze the decomposition of alane to aluminum and hydrogen via this mechanism. Thus, the addition of electron acceptors and donors, optionally with a complexing agent that is a Lewis acid or a Lewis base, inhibits the decomposition of $\alpha$-alane. The electron donor or acceptor stabilizers include tetrachlorobenzoquinone, diphenylamine, tetracyano-ethylene, 7,7,8,8-tetracyanoquinodimethane, tetrathiofulvalene, tetrakis(dimethylamino)-ethylene, and the like. The total amount of the electron donor or acceptor stabilizers provided on the $\alpha$-alane is about 0.1 to 10% of the total weight, preferably about 1–5% of the total weight. The alane is preferably doped with the stabilizers during the crystallization of the $\alpha$-alane phase, although, as described above, the stabilizers can be applied to the surface of alane during the synthesis of alane, during the acid workup process, or after the $\alpha$-alane has been isolated. In addition, band gap attenuators, that include Ti-, Si-, and P-containing derivatives, can be added during synthesis or to the surface. The band gap attenuators inhibit radical reactions.

Method for Preparing $\alpha'$-$AlH_3$

Crystals of $\alpha'$-$AlH_3$ can be prepared by reacting an alkali metal hydride with $AlCl_3$ in a solution of diethyl ether and removing the alkali metal chloride from the reaction mixture by filtration, as described in the preceding section. The process initially yields solvated alane. The solvated alane, in an ethereal solution containing an excess of an alkali metal hydride or borohydride, preferably $NaBH_4$, $NaAlH_4$, or $LiBH_4$, most preferably $LiBH_4$, is heated to about 80° C. under pressure to give primarily the nonsolvated alane phase designated $\alpha'$-$AlH_3$. Other $AlH_3$ polymorphs may be present in the solution. In addition, mixtures of the nonsolvated $\alpha$- and $\gamma$-$AlH_3$ can be prepared by slowly distilling off the ether during the heating process such that the concentration of alane approaches the saturation level.

Energetic Compositions

A primary use of stabilized $\alpha$-alane and $\alpha'$-alane as prepared herein is in the manufacture of explosive and propellant compositions, particularly in the manufacture of rocket propellant compositions, including solid and solution propellants, typically solid propellants. Alane is known to be useful as an energy dense fuel in propellant formulations; however, problems with stability have arisen, as noted previously herein. The use of alane prepared using the method of the invention significantly increases the stability of the propellant composition, and thus provides an important advance in the field.

The propellant compositions herein, in addition to alane, contain a binder material and an oxidizer. Examples of binder materials for use in propellant applications include but are not limited to polyoxetanes, polyglycidyl azide, hydroxyl-terminated polybutadiene, polybutadieneacrylonitrileacrylic acid terpolymer, polyethers, polyglycidyl nitrate, and polycaprolactone; see, e.g., U.S. Pat. No. 5,292,387 to Highsmith et al. Examples of oxidizers that may be incorporated into the compositions include, but are not limited to, ammonium nitrate (AN), phase-stabilized ammonium nitrate (PSAN), ammonium dinitramide (ADN), potassium nitrate (KN), potassium dinitramide (KDN), sodium peroxide ($Na_2O_2$), ammonium perchlorate (AP), KDN-AN, a cocrystallized form of potassium dinitramide and ammonium nitrate, cyclo-1,3,5-trimethylene-2,4,6-tri-nitramine (RDX or cyclonite), high melting explosives (HMx), diaminodinitro ethylene (DADNE), 2,4,6,8,10,12-hexanitro-2,4,6,8,10,12-hexaazaisowurtzitane (CL-20, also known as HNIW), and combinations thereof The propellant may also contain an additional fuel material, typically a metallic fuel comprised of, for example, aluminum, beryllium, boron, magnesium, zirconium, or mixtures or alloys thereof. Other components for incorporation into propellant compositions include plasticizers, burn rate modifiers, ballistic additives, and the like. In general, propellant compositions of the invention are prepared by blending the stabilized alane with the oxidizer, the binder, and a curing agent effective to cure the admixture, e.g., hexane 1,6-diisocyanate, toluene diisocyanate, isophorone diioscyanate, or the like. Proportions of fuel and oxidizer can be varied to optimize performance, as will be appreciated by those skilled in the art.

OTHER USES

The present compounds may also be used as reducing agents, as polymerization catalysts, and as a hydrogen source in fuel cells and batteries.

Use as reducing agent: An alane polymorph as synthesized herein may be used as a chemical reducing agent in any context wherein a hydride donor is appropriate to bring about reduction, e.g., in reducing unsaturated carbon-carbon bonds such as present in alkenes and alkynes, in reducing carbonyl-containing moieties such as ketones, aldehydes, carboxylic acids, esters, amides acid chlorides, in converting halides to hydrido moieties, and the like. Typically, a compound to be reduced is dissolved in an organic solvent and reacted with the stabilized α-alane of the invention, or with α'-alane as prepared herein, and the reaction product then isolated and purified.

Use in Polymerization: The alane polymorphs prepared using the methods described herein may also be used as polymerization catalysts, typically in catalyzing addition polymerization reactions, e.g., the polymerization of olefins. Generally, polymerization using the novel alane polymorphs as catalysts involves conventional processes wherein selected monomers are contacted with the alane polymorph under reaction conditions effective to provide the desired polymer composition. Polymerization may be carried out in solution, in a slurry, or in the gas phase. The monomer or comonomers used are preferably although not necessarily addition polymerizable monomers containing one or more degrees of unsaturation. Such monomers include olefinic and vinyl monomers such as ethylene, propylene, butadiene, styrene, and the like. The polymeric product resulting from the aforementioned reaction may be recovered by filtration or other suitable techniques. If desired, additives and adjuvants may be incorporated into the polymer composition prior to, during, or following polymerization; such compounds include, for example, additional catalysts (which may or may not be polymerization catalysts), pigments, antioxidants, lubricants and plasticizers.

Use as a hydrogen source in batteries and fuel cells: Additionally, the alane polymorphs prepared herein can be used as a hydrogen source in batteries and fuel cells. Alane provides a higher density of hydrogen than liquid hydrogen. Upon thermal or photochemical initiation, alane is theorized to initially produce an alane cation radical and a free electron. Both the cation radical and the electron can separately react with another alane molecule to initiate decomposition that results in the formation of hydrogen gas and aluminum metal. Thus, light, heat, or mobile electrons can be used as initiators to catalyze the decomposition. Accordingly, a composition containing the stabilized α-alane and/or the α'-alane of the invention can be used for controlled release of hydrogen gas in a battery or fuel cell.

In general, the alane products of the invention will find utility in hydrogen storage electrodes, particularly negative electrodes, in alkaline storage batteries that comprise a positive electrode, a negative electrode, and an aqueous alkaline electrolyte. In fuel cells, electrochemical devices for continuous delivery of electricity wherein the devices contain a fuel, e.g., a hydrogen source, and an oxidant, the alane products of the invention will find utility as the hydrogen source.

It is to be understood that while the invention has been described in conjunction with the preferred specific embodiments thereof, that the foregoing description as well as the examples which follow are intended to illustrate and not limit the scope of the invention. Other aspects, advantages and modifications within the scope of the invention will be apparent to those skilled in the art to which the invention pertains.

All patents, patent applications, and publications mentioned herein are hereby incorporated by reference in their entireties.

EXPERIMENTAL

The following examples are put forth so as to provide those of ordinary skill in the art with a complete disclosure and description of how to carry out the methods of the invention arid prepare and use the claimed compounds and compositions. Efforts have been made to ensure accuracy with respect to numbers (e.g., amounts, temperature, etc.) but some errors and deviations should be accounted for. Unless indicated otherwise, parts are parts by weight, temperature is in ° C. and pressure is at or near atmospheric.

EXAMPLE 1

SYNTHESIS OF α-ALANE

A reaction flask containing 600 mL of ether and 35 mL of a 1 M ether solution of $AlCl_3$ was purged with argon. To the solution was then added 6.7 g of solid $LiAlH_4$ over a period of 15 min. The reaction was stirred for 15 min. and then 45 mL of a 1 M $LiBH_4$ in ether solution was added. The reaction was stirred for a further 30 min. at room temperature, and then filtered to remove lithium chloride.

The filtrate was transferred to a flask containing a diethyl ether solution of about 50 mole % of sodium borohydride. To the solution was then added 2.5 L of toluene and the solution was stirred for a further 20 min., filtered into a reaction flask, and the reaction flask was connected to a distillation column. The diethyl ether was removed under vacuum by heating the reaction flask to about 60° C. until only about 7% ether was left in the reaction flask. The reaction flask was then heated at 82–85° C. for about 2 h., and then at 90–93° C. for about 30 min. During heating, white crystalline particles formed that grow in size during the heating period. Following the heating cycles, the white crystalline product was collected by filtration, washed twice with diethyl ether, and dried under reduced pressure to give the α-alane product.

EXAMPLE 2

SYNTHESIS OF α'-ALANE

The solvated alane was produced as in Example 1. After filtration of the ether solution to remove lithium chloride, $LiAlH_4$ was added to the solution, and the ethereal solution was heated to about 80° C. for 2 h. White crystalline particles form that grow in size during the heating period, and were collected by filtration. The crystalline product was washed twice with diethyl ether, and was dried under reduced pressure to give the α'-alane product.

EXAMPLE 3

STABILIZATION OF CRYSTALLINE ALUMINUM HYDRIDE (a) The α-alane product of Example 1 was slowly added to 10% v/v of aqueous HCl while stirring. The resulting suspension was stirred at room temperature for 2 hours. The solid was collected by filtration, rinsed once with water, ethanol, and diethyl ether, and then dried to a constant weight under reduced pressure.

(b) The procedure of part (a) was repeated with an alane stabilization agent, aluminon, in the aqueous HCl (10% v/v).

EXAMPLE 4

STABILIZATION OF CRYSTALLINE ALUMINUM HYDRIDE WITH SURFACE STABILIZERS

The α-alane product of Example 1 was slowly added to methanol containing aluminon (4% w/v). The methanol slurry was stirred at room temperature for 30 min. and then methanol was slowly evaporated with gentle heating over a period of 5 h. The solid was rinsed once with water, ethanol, and diethyl ether, and then dried to a constant weight under reduced pressure.

EXAMPLE 5

EVALUATION OF STABILITY

The α-alane product prepared in Example 3(b) was compared with an α-alane: product prepared without an acid wash workup or surface stabilizers, as follows. Both samples were stored at about 60° C. and the percentage decomposition over time was evaluated using a standard Taliani test apparatus. The test results are shown in FIG. 1. As may be seen, the alane product prepared using the method of the invention was significantly more stable than the alane product prepared using the method of the prior art.

The thermal stability of the α-alane product prepared in Example 3(b) was also studied by DSC and TGA. In the DSC experiments, the sample did not exhibit the onset of an exothermic reaction until about 162° C. that was followed immediately with a large endothermic reaction. In the TGA experiments, samples of α-alane of Example 3 rapidly lost weight between 162–215° C. The observed mass loss was about 9 to 10% of the total mass, and corresponds to the theoretical amount of 10% hydrogen in $AlH_3$. In a separate experiment, the alane did not lose mass at 70° C. in a humid environment after 2 days.

EXAMPLE 6

MANUFACTURE OF ENERGETIC COMPOSITIONS

The stabilized α-alane of Example 3(b), ammonium perchlorate, ammonium dinitramide and hydroxyl-terminated polybutadiene, are blended to substantial homogeneity and cured with any one of a variety of curing agents including, but not limited to, hexane 1,6-diisocyanate, toluene diisocyanate and isophorone diisocyanate. The proportions of fuel and oxidizer can be varied arbitrarily within the constraint of the loading tolerance of the binder system, so as to optimize any aspect of performance.

What is claimed is:

1. A method for preparing α-$AlH_3$, comprising the steps of:
   (a) reacting an alkali metal hydride with $AlCl_3$ in a solution of diethyl ether to form an initial $AlH_3$ product in a reaction mixture, along with an alkali metal chloride;
   (b) removing the alkali metal chloride from the reaction mixture by filtration;
   (c) adding an excess of toluene to the filtrate resulting from step (b), providing a diethyl ether-toluene solution;
   (d) heating and distilling the diethyl ether-toluene solution to reduce the amount of diethyl ether in the solution, until a precipitate is formed;
   (e) isolating the precipitate; and
   (f) adding the precipitate to an acidic solution effective to dissolve and thus remove materials other than α-$AlH_3$.

2. The method of claim 1, further comprising:
   (g) isolating α-$AlH_3$ from the acidic solution.

3. The method of claim 1, wherein the acidic solution of step (f) contains an α-$AlH_3$ stabilizing agent.

4. The method of claim 3, wherein the α-$AlH_3$ stabilizing agent comprise a compound that coordinates to the $Al^{3+}$ ion.

5. The method of claim 4, wherein the α-$AlH_3$ stabilizing agent is aluminon.

6. The method of claim 4, wherein the α-$AlH_3$ stabilizing agent is 8-hydroxyquinoline.

7. The method of claim 4, wherein the α-$AlH_3$ stabilizing agent is catechol.

8. The method of claim 3, wherein the α-$AlH_3$ stabilizing agent is an electron donor or an electron acceptor.

9. The method of claim 8, wherein the electron donor or electron acceptor is selected from the group consisting of tetrachlorobenzoquinone, diphenylamine, tetracyanoethylene, 7,7,8,8-tetracyanoquinodimethane, tetrathiafulvalene and tetrakis(dimethylamino)ethylene.

10. The method of claim 1, further including, after step (b) and prior to step (d), adding an additional alkali metal hydride to the reaction mixture and/or the diethyl ether-toluene solution, followed by a further filtration step, wherein the additional alkali metal hydride may or may not be the same as the alkali metal hydride of step (a).

11. The method of claim 1, wherein the alkali metal hydride is $LiAlH_4$.

12. The method of claim 1, wherein the alkali metal hydride is $LiBH_4$.

13. The method of claim 1, wherein the molar ratio of the alkali metal hydride to $AlCl_3$ in step (a) is in the range of approximately 3:1 to 4.5:1.

14. The method of claim 1, wherein the acidic solution is an HCl solution.

15. The method of claim 14, wherein the acidic solution is approximately 5% to 15% (w/w) HCl.

* * * * *